(12) United States Patent
Kim et al.

(10) Patent No.: US 10,846,864 B2
(45) Date of Patent: Nov. 24, 2020

(54) METHOD AND APPARATUS FOR DETECTING GESTURE IN USER-BASED SPATIAL COORDINATE SYSTEM

(71) Applicant: VTOUCH CO., LTD, Seoul (KR)

(72) Inventors: Seokjoong Kim, Seoul (KR);
Chunghoon Kim, Seongnam-si (KR);
Beomho Lee, Seongnam-si (KR)

(73) Assignee: VTouch Co., Ltd., Seoul (KR)

( * ) Notice: Subject to any disclaimer, the term of this patent is extended or adjusted under 35 U.S.C. 154(b) by 31 days.

(21) Appl. No.: 15/835,809

(22) Filed: Dec. 8, 2017

(65) Prior Publication Data
US 2018/0173318 A1 Jun. 21, 2018

Related U.S. Application Data

(63) Continuation of application No. PCT/KR2016/006170, filed on Jun. 10, 2016.
(Continued)

(51) Int. Cl.
*G06T 7/20* (2017.01)
*G06T 7/285* (2017.01)
(Continued)

(52) U.S. Cl.
CPC .............. *G06T 7/20* (2013.01); *G06F 3/017* (2013.01); *G06K 9/00355* (2013.01);
(Continued)

(58) Field of Classification Search
CPC .. G06K 9/00201; G06K 9/00355; G06K 9/48; G06K 9/6201; G06K 9/481;
(Continued)

(56) References Cited

U.S. PATENT DOCUMENTS 5,454,043 A * 9/1995 Freeman .............. A61B 5/1121
345/419
5,483,261 A * 1/1996 Yasutake ............... G06F 3/0425
178/18.03
(Continued)

FOREIGN PATENT DOCUMENTS

JP 2000353046 A 12/2000
KR 100814289 B1 3/2008
(Continued)

OTHER PUBLICATIONS

International Search Report for PCT/KR2016/006170 filed Sep. 12, 2016.
(Continued)

*Primary Examiner* — Michael J Jansen, II
(74) *Attorney, Agent, or Firm* — Dinsmore & Shohl LLP; Yongsok Choi, Esq.

(57) ABSTRACT

Disclosed are a method and an apparatus for accurately detecting a gesture from a user's motion using a user-based spatial coordinate system. A method for detecting a gesture in a user-based spatial coordinate system comprises the steps of: setting a user-based spatial coordinate system using a first body coordinate corresponding to a first body part of the user as a starting point; analyzing the motion vector state of a second body coordinate corresponding to a second body part of the user in the user-based spatial coordinate system over time; and detecting the user's gesture on the basis of a change in the motion vector state.

15 Claims, 15 Drawing Sheets

Related U.S. Application Data

(60) Provisional application No. 62/173,417, filed on Jun. 10, 2015.

(51) Int. Cl.
*G06F 3/01* (2006.01)
*G06K 9/00* (2006.01)

(52) U.S. Cl.
CPC .............. *G06T 7/285* (2017.01); *G06F 3/011* (2013.01); *G06F 3/013* (2013.01); *G06K 9/00201* (2013.01)

(58) Field of Classification Search
CPC ....... G06K 9/00335; G06T 7/20; G06T 7/285; G06T 7/70; G06F 3/017; G06F 3/011; G06F 3/0482; G06F 3/04815; G06F 3/0346; G06F 3/013
See application file for complete search history.

(56) References Cited

U.S. PATENT DOCUMENTS

| | | | | |
|---|---|---|---|---|
| 6,512,838 B1* | 1/2003 | Rafii | | G01C 3/08 348/E3.018 |
| 6,531,999 B1* | 3/2003 | Trajkovic | | G06F 3/0304 345/157 |
| 6,600,475 B2* | 7/2003 | Gutta | | G06F 3/0304 345/156 |
| 6,757,068 B2* | 6/2004 | Foxlin | | G02B 27/017 356/139.03 |
| 7,343,026 B2* | 3/2008 | Niwa | | A61B 6/467 382/103 |
| 8,073,198 B2* | 12/2011 | Marti | | G06F 3/011 345/156 |
| 8,823,642 B2* | 9/2014 | Valik | | G06F 3/0304 345/156 |
| 8,839,279 B2* | 9/2014 | Miller, IV | | G06F 3/017 725/10 |
| 8,840,466 B2* | 9/2014 | Kareemi | | A63F 13/10 463/31 |
| 8,872,762 B2* | 10/2014 | Galor | | G06F 3/011 345/156 |
| 8,922,485 B1* | 12/2014 | Lloyd | | G06F 3/0487 345/156 |
| 8,933,882 B2* | 1/2015 | Burachas | | G06F 3/012 345/157 |
| 8,933,886 B2* | 1/2015 | Imoto | | G06F 3/013 345/158 |
| 8,947,351 B1* | 2/2015 | Noble | | G06F 3/0488 345/156 |
| 8,971,572 B1* | 3/2015 | Yin | | G06K 9/00355 345/173 |
| 8,994,656 B2* | 3/2015 | Kneissler | | G06F 3/0317 345/156 |
| 9,122,353 B2* | 9/2015 | Dong | | G06F 3/0425 |
| 9,128,530 B2* | 9/2015 | Yin | | G06K 9/00355 |
| 9,245,063 B2* | 1/2016 | Zayic | | G06F 17/50 |
| 9,285,874 B2* | 3/2016 | Bychkov | | G06F 3/013 |
| 9,310,891 B2* | 4/2016 | Rafii | | G06F 3/017 |
| 9,342,146 B2* | 5/2016 | Bychkov | | G06F 3/013 |
| 9,361,512 B2* | 6/2016 | Cronholm | | G06F 3/017 |
| 9,448,636 B2* | 9/2016 | Balzacki | | G06F 3/017 |
| 9,454,225 B2* | 9/2016 | Bychkov | | G06F 3/013 |
| 9,529,513 B2* | 12/2016 | Balan | | G06F 3/04847 |
| 9,671,869 B2* | 6/2017 | Katz | | G06F 3/017 |
| 9,690,388 B2* | 6/2017 | Cronholm | | G06F 3/017 |
| 9,690,982 B2* | 6/2017 | Bulzacki | | G06F 3/017 |
| 9,753,546 B2* | 9/2017 | Abi-Rached | | G06F 3/017 |
| 9,778,748 B2* | 10/2017 | Shimura | | G06F 3/017 |
| 9,823,764 B2* | 11/2017 | Schwesinger | | G02B 27/017 |
| 9,846,486 B2* | 12/2017 | Katz | | G06F 3/013 |
| 9,857,878 B2* | 1/2018 | Lee | | G06F 3/013 |
| 9,952,663 B2* | 4/2018 | Kempinski | | G06F 3/017 |
| 10,082,879 B2* | 9/2018 | Niinuma | | G06F 3/017 |
| 10,168,787 B2* | 1/2019 | van Laack | | G06F 3/013 |
| 10,186,057 B2* | 1/2019 | Shimura | | G06K 9/00355 |
| 10,248,218 B2* | 4/2019 | Katz | | G06F 3/017 |
| 10,359,865 B2* | 7/2019 | Yamada | | G06F 3/03545 |
| 10,678,324 B2* | 6/2020 | Miller | | G06F 3/011 |
| 10,796,694 * | 10/2020 | Kim | | G10L 15/24 |
| 2002/0024675 A1* | 2/2002 | Foxlin | | G02B 27/017 356/620 |
| 2002/0097218 A1* | 7/2002 | Gutta | | G06F 3/0304 345/156 |
| 2004/0201857 A1* | 10/2004 | Foxlin | | G02B 27/017 356/620 |
| 2004/0242988 A1* | 12/2004 | Niwa | | A61B 6/467 600/407 |
| 2008/0147687 A1* | 6/2008 | Furukawa | | G06F 3/03545 |
| 2008/0273797 A1* | 11/2008 | Takikawa | | G06F 3/03545 382/188 |
| 2009/0110235 A1* | 4/2009 | Marti | | G06F 3/011 382/103 |
| 2012/0068927 A1* | 3/2012 | Poston | | G06F 3/0317 345/163 |
| 2012/0135805 A1* | 5/2012 | Miller, IV | | G06F 3/017 463/36 |
| 2012/0206333 A1* | 8/2012 | Kim | | G06F 3/013 345/156 |
| 2012/0223882 A1* | 9/2012 | Galor | | G06F 3/017 345/157 |
| 2012/0270653 A1* | 10/2012 | Kareemi | | A63F 13/52 463/33 |
| 2013/0002551 A1* | 1/2013 | Imoto | | G06F 3/013 345/158 |
| 2013/0009861 A1* | 1/2013 | Valik | | G06F 3/017 345/156 |
| 2013/0154913 A1* | 6/2013 | Genc | | G06F 3/012 345/156 |
| 2013/0155026 A1* | 6/2013 | Dong | | G06F 3/0425 345/175 |
| 2013/0215069 A1* | 8/2013 | Lee | | G06F 1/1626 345/173 |
| 2013/0278501 A1* | 10/2013 | Bulzacki | | G06F 3/017 345/157 |
| 2013/0321265 A1* | 12/2013 | Bychkov | | G06F 3/013 345/156 |
| 2013/0321271 A1* | 12/2013 | Bychkov | | G06F 3/013 345/158 |
| 2013/0321347 A1* | 12/2013 | Kim | | G06F 3/017 345/175 |
| 2014/0028548 A1* | 1/2014 | Bychkov | | G06F 3/013 345/156 |
| 2014/0071051 A1* | 3/2014 | Kneissler | | G06F 3/0317 345/158 |
| 2014/0184494 A1* | 7/2014 | Burachas | | G06F 3/012 345/156 |
| 2014/0200080 A1* | 7/2014 | Kim | | G06F 3/0304 463/32 |
| 2014/0303937 A1* | 10/2014 | Zayic | | G06F 17/50 703/1 |
| 2014/0354602 A1* | 12/2014 | He | | G06F 3/017 345/175 |
| 2014/0375547 A1* | 12/2014 | Katz | | G06F 3/017 345/156 |
| 2015/0009415 A1* | 1/2015 | Wong | | G06F 3/0484 348/745 |
| 2015/0035746 A1* | 2/2015 | Cockburn | | G06F 3/013 345/156 |
| 2015/0040040 A1* | 2/2015 | Balan | | G06F 3/04847 715/762 |
| 2015/0062003 A1* | 3/2015 | Rafii | | G06F 3/017 345/156 |
| 2015/0145762 A1* | 5/2015 | Shimura | | G06F 3/017 345/156 |
| 2015/0149956 A1* | 5/2015 | Kempinski | | G06F 3/017 715/784 |
| 2015/0177846 A1* | 6/2015 | Yin | | G06K 9/00355 382/103 |

(56) References Cited

U.S. PATENT DOCUMENTS

| | | | | |
|---|---|---|---|---|
| 2015/0185851 A1* | 7/2015 | Kauffmann | | G06F 3/017 345/156 |
| 2015/0220776 A1* | 8/2015 | Cronholm | | G06F 3/017 382/103 |
| 2015/0234468 A1* | 8/2015 | Hwang | | G06F 3/017 345/156 |
| 2015/0302617 A1* | 10/2015 | Shimura | | G06K 9/00355 345/441 |
| 2016/0062469 A1* | 3/2016 | Abi-Rached | | G06F 3/017 345/156 |
| 2016/0162082 A1* | 6/2016 | Schwesinger | | G02B 27/017 345/173 |
| 2016/0179205 A1* | 6/2016 | Katz | | G06F 3/013 345/156 |
| 2016/0187990 A1* | 6/2016 | Lee | | G06F 3/017 345/156 |
| 2016/0195935 A1* | 7/2016 | Cronholm | | G06F 3/017 345/156 |
| 2016/0328604 A1* | 11/2016 | Bulzacki | | G06K 9/00335 |
| 2017/0046568 A1* | 2/2017 | Bulzacki | | G06F 3/017 |
| 2017/0147078 A1* | 5/2017 | van Laack | | G06F 3/013 |
| 2017/0153713 A1* | 6/2017 | Niinuma | | G06F 3/017 |
| 2017/0235376 A1* | 8/2017 | Katz | | G06F 3/017 345/158 |
| 2018/0088676 A1* | 3/2018 | Ach | | G06F 3/011 |
| 2018/0129314 A1* | 5/2018 | Yamada | | G06F 3/0383 |
| 2018/0173318 A1* | 6/2018 | Kim | | G06T 7/20 |
| 2019/0004611 A1* | 1/2019 | Katz | | G06F 3/013 |
| 2019/0019515 A1* | 1/2019 | Kim | | G06F 3/017 |
| 2019/0155374 A1* | 5/2019 | Miller | | G06F 3/0346 |

FOREIGN PATENT DOCUMENTS

| | | |
|---|---|---|
| KR | 1020080051013 A | 6/2008 |
| KR | 1020090093220 A | 9/2009 |
| KR | 1020120108728 A | 10/2012 |
| KR | 1020130098837 A | 9/2013 |

OTHER PUBLICATIONS

Nickel, et al., "Visual Recognition of Pointing Gestures for Human-Robot Interaction," Science Direct Article, Elsevier Image and Vision Computing Journal, Published Dec. 3, 2007, vol. 25, Issue 12, pp. 1875-1884, Interactive Systems Labs, Universitaet Karlsruhe, 76131 Karlsruhe, Germany, URL: https://www.sciencedirect.com/science/article/abs/pii/S0262885606002897.

\* cited by examiner

METHOD AND APPARATUS FOR DETECTING GESTURE IN USER-BASED SPATIAL COORDINATE SYSTEM

CROSS-REFERENCE TO RELATED APPLICATION(S)

This application is a continuation application of Patent Cooperation Treaty (PCT) international application Serial No. PCT/KR2016/006170, filed on Jun. 10, 2016, which claims priority to U.S. Patent Application Ser. No. 62/173,417, filed on Jun. 10, 2015. The entire contents of PCT international application Serial No. PCT/KR2016/006170, and U.S. Patent Application Ser. No. 62/173,417 are hereby incorporated by reference.

FIELD

The present disclosure relates to a method and apparatus for detecting a gesture in a user-based spatial coordinate system, and more particularly, to a method and apparatus for accurately detecting a gesture from a user's motion using a user-based spatial coordinate system, regardless of the geometric arrangement (e.g., position and direction) of the user with respect to a three-dimensional coordinates detection means (e.g., a 3D camera) of the user's body (hereinafter referred to as "three-dimensional coordinates detection means").

BACKGROUND

A gesture by means of a motion of a body part may be performed through a three-dimensional coordinates detection means. For example, among the three-dimensional coordinates detection means, 3D cameras (e.g., ToF, structured light, stereo, dual aperture, etc.), Radar, Lidar and the like are configured to detect a position of a user's body coordinate point from the outside. Three-dimensional coordinates of the body may also be detected from a sensor worn by the user, such as a GPS (Global Positioning System), an IPS (Indoor Positioning System), RSSI (Received Signal Strength Indication), a gyro sensor, an acceleration sensor, and a magnetic field sensor.

However, in conventional gesture recognition techniques, there is a disadvantage that when the user performs a motion in a direction in which the user does not exactly face the three-dimensional coordinates detection means, the user's motion is misrecognized or cannot be recognized depending on the position or direction of the user. Particularly, there is a disadvantage that when several devices are controlled by a single three-dimensional coordinates detection means, the geometrical arrangement (e.g., position and direction) between the three-dimensional coordinates detection means and the user is changed every time a gesture is performed toward each device, so that the user's motion cannot be recognized as a correct gesture.

FIG. 1 is a diagram illustrating a problem of a conventional gesture recognition technique.

FIG. 1 illustrates a case where a user 11 moves his/her finger from an initial position 101 to a side thereof 103 in an oblique direction, without exactly facing a three-dimensional coordinates detection means 10. In the conventional gesture recognition technique, a space vector 105 representing the above movement may be erroneously recognized as meaning forward or backward movement of the finger, differently from the user's intention. Otherwise, there is also a problem that even though the recognition is made as intended by the user, the recognition rate may be very low.

Therefore, there is a demand for a technique for accurately detecting a gesture from a user's motion, regardless of the geometric arrangement between the user and a three-dimensional coordinates detection means.

SUMMARY

The present disclosure has been conceived in response to such a demand, and one object of the disclosure is to provide a method and apparatus for accurately detecting a gesture from a user's motion using a user-based spatial coordinate system. According to one aspect of the disclosure, there is provided a method for detecting a gesture in a user-based spatial coordinate system, comprising the steps of: defining a user-based spatial coordinate system whose origin is located at a first body coordinate point corresponding to a first body part of a user; analyzing a state of a motion vector over time of a second body coordinate point corresponding to a second body part of the user in the user-based spatial coordinate system; and detecting a gesture of the user based on a change in the state of the motion vector.

Here, the user-based spatial coordinate system includes a front/rear axis, a left/right axis, and an up/down axis, and the step of defining the user-based spatial coordinate system may comprise the step of creating the front/rear axis to pass through the first and second body coordinate points.

Further, the step of defining the user-based spatial coordinate system may further comprise the steps of: creating the left/right axis to pass through the first body coordinate point, to perpendicularly cross the front/rear axis, and to be parallel to a ground surface; and creating the up/down axis to pass through the first body coordinate point and to perpendicularly cross both the front/rear axis and the left/right axis.

Further, the step of defining the user-based spatial coordinate system may further comprise the steps of: creating the up/down axis to pass through the first body coordinate point, to perpendicularly cross a straight line connecting the first body coordinate point and a third body coordinate point corresponding to a third body part at the first body coordinate point, and to perpendicularly cross the front/rear axis at the first body coordinate point; and creating the left/right axis to pass through the first body coordinate point and to perpendicularly cross both the front/rear axis and the up/down axis.

Further, the step of analyzing the state of the motion vector may comprise the step of creating the motion vector V to have spherical coordinates, with respect to the second body coordinate point $(x_1, y_1, z_1)$ of the second body part at a first time point and the second body coordinate point $(x_2, y_2, z_2)$ at a second time point, as below:

$$V = (r, \theta, \varphi)$$
$$= (\sqrt{(x_2-x_1)^2 + (y_2-y_1)^2 + (z_2-z_1)^2},$$
$$\arccos(z_2-z_1)/r, \arctan(y_2-y_1)/(x_2-x_1)).$$

Further, the step of analyzing the state of the motion vector may further comprise the step of specifying the state of the motion vector as any one of a stationary state, a forward movement state, a backward movement state, and a surface movement state, based on the r, $\theta$ and $\varphi$ of the motion vector.

Further, the step of detecting the gesture of the user may comprises the step of determining that a touch gesture is made, when the state of the motion vector is changed from the forward movement state to the stationary state.

Further, the step of detecting the gesture of the user may comprise the step of determining that a release gesture is made, when the state of the motion vector is changed to the backward movement state.

Further, the step of detecting the gesture of the user may comprise the step of determining that a click gesture is made, when the state of the motion vector is changed from the forward movement state through the stationary state to the backward movement state, or from the forward movement state to the backward movement state.

Further, the step of detecting the gesture of the user may comprise the step of determining that a drag gesture is made on a surface of a virtual sphere, when the state of the motion vector remains in the surface movement state. Furthermore, the step of detecting the gesture of the user may comprise the step of determining that a hold gesture is made, when the state of the motion vector remains in the stationary state.

Further, the step of detecting the gesture of the user may comprise the step of determining that a deep touch gesture is made, when the state of the motion vector is changed in an order of the forward movement state, the stationary state, the forward movement state, and the stationary state.

According to another aspect of the disclosure, there is provided an apparatus for detecting a gesture in a user-based spatial coordinate system, comprising: a three-dimensional body coordinates reception unit configured to receive a plurality of body coordinate points corresponding to a plurality of body parts including a first body part and a second body part of a user from an external three-dimensional body coordinates detection means; a user-based spatial coordinate system definition unit configured to create a user-based spatial coordinate system whose origin is located at a first body coordinate point corresponding to the first body part, based on the plurality of body coordinate points; a motion vector analysis unit configured to generate a motion vector over time of a second body coordinate point, and to determine a state of the motion vector; and a gesture detection unit configured to detect a gesture of the user based on a change in the state of the motion vector.

Here, the user-based spatial coordinate system definition unit may comprise a front/rear axis definition unit configured to define a front/rear axis of the user-based spatial coordinate system to pass through the first and second body coordinate points.

Further, the user-based spatial coordinate system definition unit may further comprise: a left/right axis definition unit configured to create a left/right axis to pass through the first body coordinate point, to perpendicularly cross the front/rear axis, and to be parallel to a ground surface; and an up/down axis definition unit configured to create an up/down axis to pass through the first body coordinate point and to perpendicularly cross both the front/rear axis and the left/right axis.

Alternatively, the user-based spatial coordinate system definition unit may further comprise: an up/down axis definition unit configured to create an up/down axis to pass through the first body coordinate point, to perpendicularly cross a straight line connecting the first body coordinate point and a third body coordinate point corresponding to a third body part at the first body coordinate point, and to perpendicularly cross the front/rear axis at the first body coordinate point; and a left/right axis definition unit configured to create a left/right axis to pass through the first body coordinate point and to perpendicularly cross both the front/rear axis and the up/down axis.

Further, the motion vector analysis unit may comprise a motion vector creation unit configured to create the motion vector V to have spherical coordinates, with respect to the second body coordinate point $(x_1, y_1, z_1)$ of the second body part at a first time point and the second body coordinate point $(x_2, y_2, z_2)$ at a second time point, as below:

$$V = (r, \theta, \varphi)$$
$$= \left(\sqrt{(x_2-x_1)^2 + (y_2-y_1)^2 + (z_2-z_1)^2}, \arccos(z_2-z_1)/r, \arctan(y_2-y_1)/(x_2-x_1)\right).$$

Further, the motion vector analysis unit may further comprise a motion vector state determination unit configured to specify the state of the motion vector as any one of a stationary state, a forward movement state, a backward movement state, and a surface movement state, based on the r, θ and φ of the motion vector.

Further, the gesture detection unit may comprise: a motion vector monitoring unit configured to monitor a change in the state of the motion vector; a gesture storage unit configured to store a type of gesture corresponding to each type of change in the state of the motion vector; and a gesture determination unit configured to determine the type of gesture of the user corresponding to the change in the state of the motion vector, based on the gesture storage unit.

According to the disclosure, there may be implemented a method and apparatus for accurately detecting a gesture from a user's motion using a user-based spatial coordinate system, regardless of the geometrical arrangement (e.g., position and direction) between the user and a three-dimensional coordinates detection means.

DETAILED DESCRIPTION

Hereinafter, the present disclosure will be described in more detail with reference to the accompanying drawings.

Figure 1:
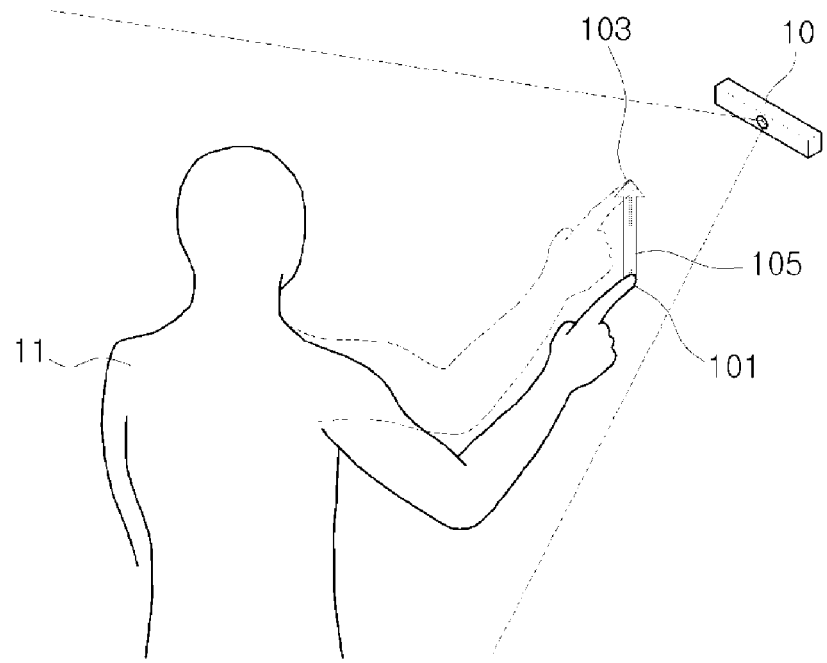
FIG. 1 is a diagram illustrating a problem of a conventional gesture recognition technique.
Figure 2:
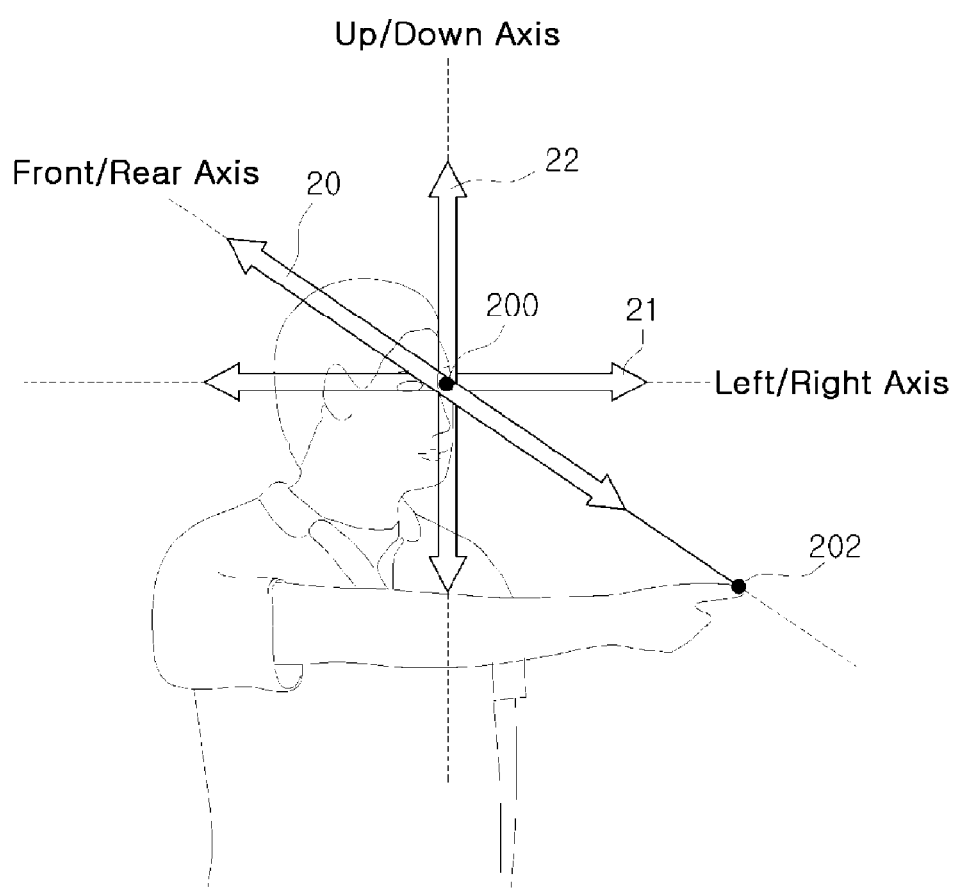
FIG. 2 is a diagram showing an example of a user-based spatial coordinate system.

FIG. 2 is a diagram showing an example of a user-based spatial coordinate system.

As illustrated in FIG. 2, the present disclosure forms a spatial coordinate system based on a user. By forming the spatial coordinate system based on the user, a motion of the user may be interpreted as intended by the user, regardless of the geometrical arrangement between the user and a camera.

First, in the user-based spatial coordinate system, a straight line connecting a coordinate point of a first body part of the user and that of a second body part is defined as a "front/rear axis".

Throughout the specification, the coordinate point of the first body part serves as an origin of the user-based spatial coordinate system. The first body part may be selected as one of two eyes of the user, for example. However, any body part may be designated as the first body part as long as it may function as the origin of the user-based spatial coordinate system. Further, the second body part serves as a body part with which a motion is performed. A gesture is detected from the motion of the second body part. The second body part may be selected as a fingertip of a particular finger of the user, for example. However, any body part may be designated as the second body part as long as the motion is performed over time.

Next, a "left/right axis" and "up/down axis" are defined on a plane perpendicularly crossing the front/rear axis at the first body part. When the left/right axis is first defined, the up/down axis is determined as an axis perpendicularly crossing both the front/rear axis and left/right axis. In some cases, the up/down axis may be first defined and the left/right axis may be determined as an axis perpendicularly crossing both the front/rear axis and up/down axis.

The left/right axis refers to an axis that the user recognizes as being horizontal. The user's space is divided into left and right sides by the left/right axis.

Further, the up/down axis refers to an axis that the user recognizes as being vertical. The user's space is divided into upper and lower sides by the up/down axis.

Furthermore, the front/rear axis refers to an axis that the user recognizes as being front and rear. The user's space is divided into front and rear sides by the front/rear axis.

In addition, the left/right axis, up/down axis and front/rear axis may correspond to the x-axis, y-axis and z-axis, respectively, in a general space coordinate system notation.

Figure 3:
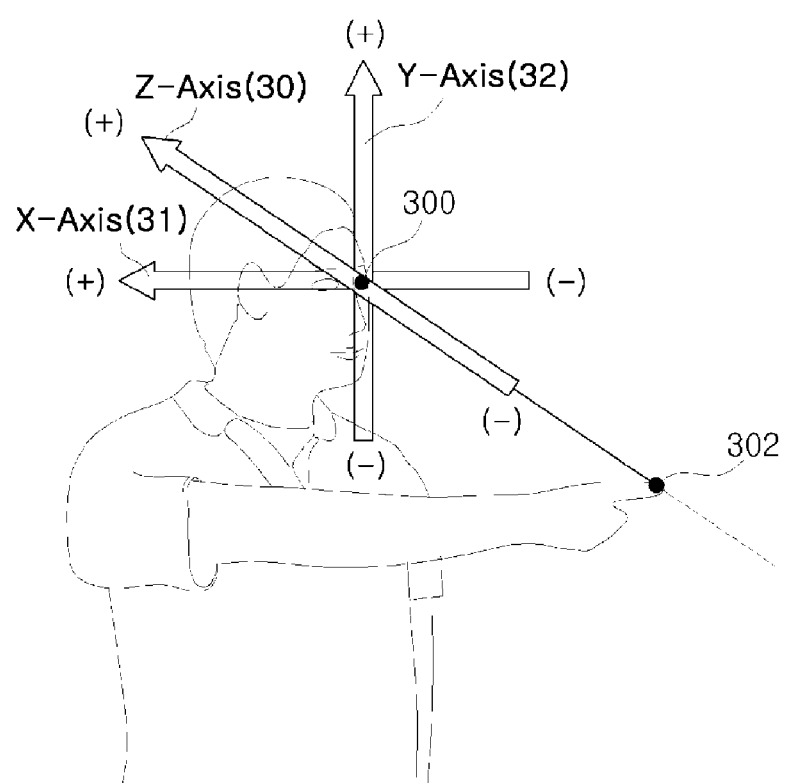
FIG. 3 is a diagram in which the three axes of the user-based spatial coordinate system of FIG. 2 correspond to the x-axis, y-axis and z-axis.

FIG. 3 is a diagram in which the three axes of the user-based spatial coordinate system of FIG. 2 correspond to the x-axis, y-axis and z-axis.

As shown in FIG. 3, a left/right axis 21 in FIG. 2 may correspond to an x-axis 31. For example, the positive (+) direction of the x-axis 31 corresponds to the user's "right side" in the user-based spatial coordinate system.

An up/down axis 22 may correspond to a y-axis 32. For example, the positive (+) direction of the y-axis 32 corresponds to the user's "upper side" in the user-based spatial coordinate system. A front/rear axis 20 may correspond to a z-axis 30. For example, the positive (+) direction of the z-axis 30 corresponds to the user's "rear side" in the user-based spatial coordinate system.

Figure 4:
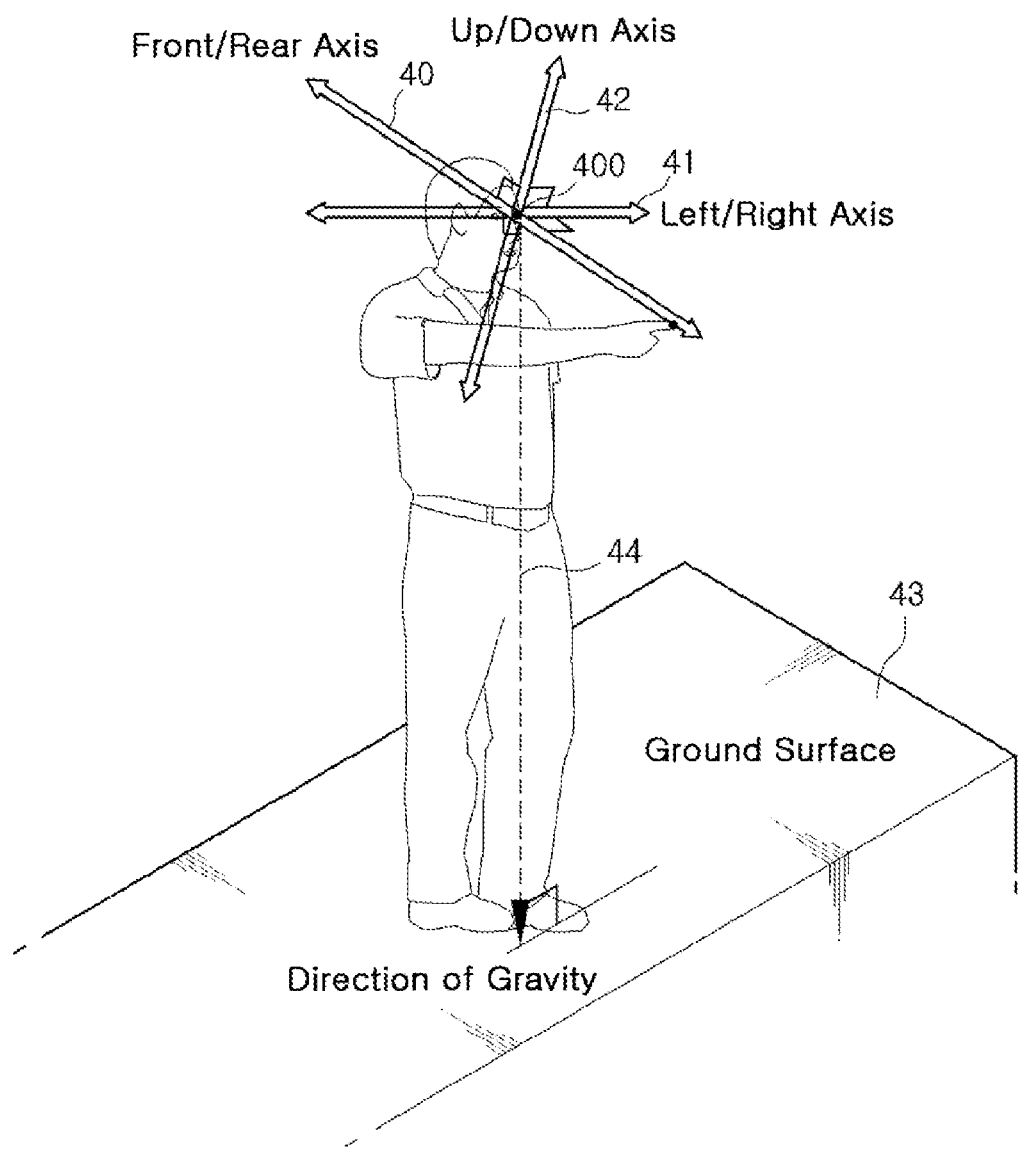
FIG. 4 is a diagram showing an example of a method for defining an up/down axis and left/right axis of a user-based spatial coordinate system.

FIG. 4 is a diagram showing an example of a method for defining an up/down axis and left/right axis of a user-based spatial coordinate system.

The user-based spatial coordinate system illustrated in FIG. 4 is defined such that a left/right axis is perpendicular to a front/rear axis and the direction of gravity, and an up/down axis is perpendicular to the front/rear axis and left/right axis. When a user stands on a horizontal surface, the left/right axis may be first defined as (i) passing through a first body part 400, (ii) being perpendicular to the direction of gravity, and (iii) perpendicularly crossing the front/rear axis at the first body part 400, so that the left and right directions recognized by the user coincide with the direction of the left/right axis. Likewise, the left/right axis may also be defined as (i) passing through the first body part 400, (ii) being parallel to a ground surface, and (iii) perpendicularly crossing the front/rear axis at the first body part 400, so that the left and right directions recognized by the user coincide with the direction of the left/right axis.

The up/down axis is determined as a straight line perpendicularly crossing both the left/right axis and front/rear axis at the origin which corresponds to the first body part 400.

Figure 5:
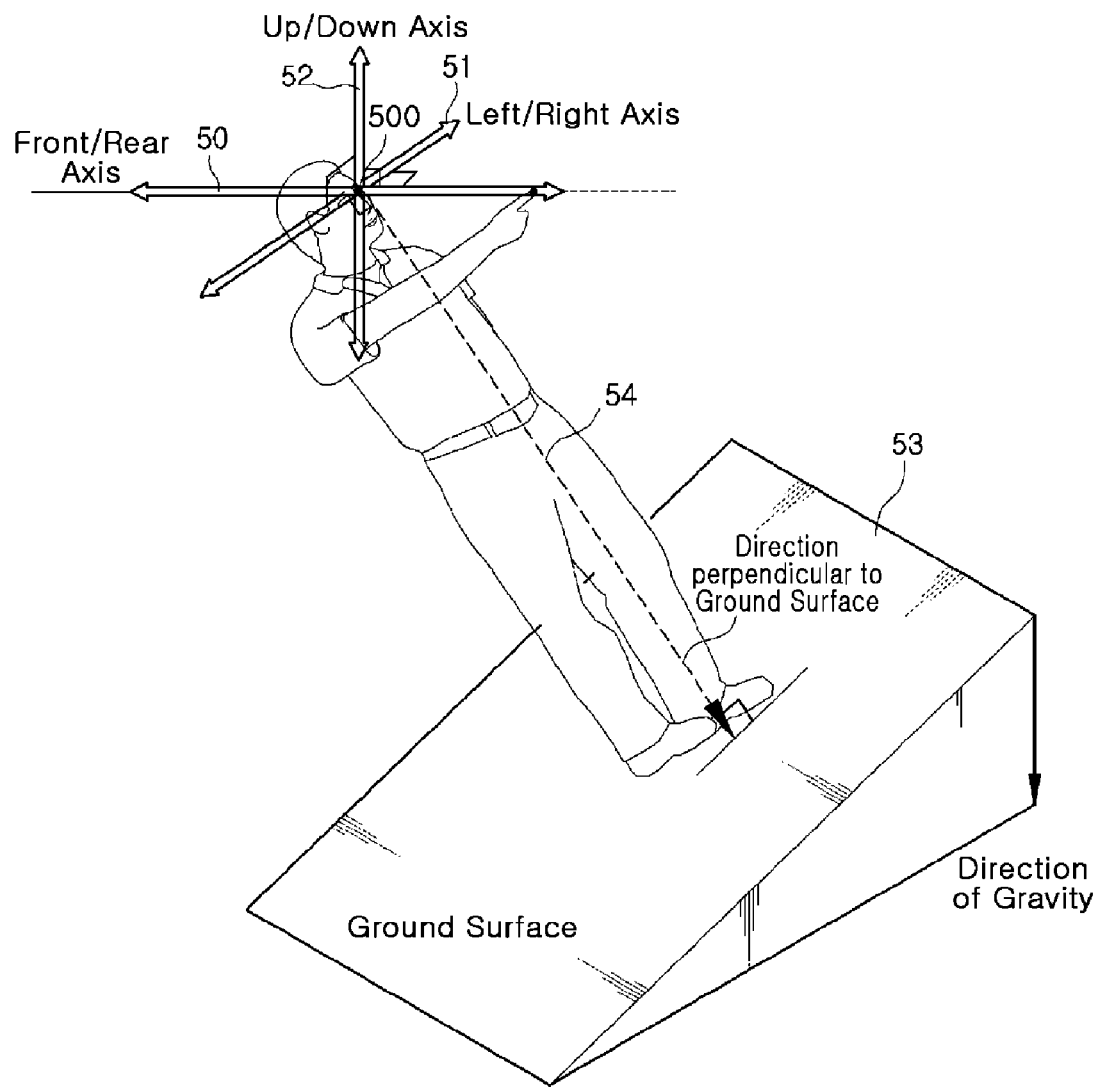
FIG. 5 is a diagram showing another example of a method for defining an up/down axis and left/right axis of a user-based spatial coordinate system.

FIG. 5 is a diagram showing another example of a method for defining an up/down axis and left/right axis of a user-based spatial coordinate system.

When a user stands on an inclined surface, the direction of gravity does not coincide with the direction of an up/down axis recognized by a user.

Thus, in order to address the situation in which the user stands on the inclined surface, a left/right axis may be first defined as (i) passing through a first body part 500, (ii) being parallel to a ground surface 53, and (iii) perpendicularly crossing a front/rear axis at the first body part 500, so that the left and right directions recognized by the user coincide with the direction of the left/right axis.

In this case, an up/down axis is determined as a straight line perpendicularly crossing both the left/right axis and front/rear axis at the origin which corresponds to the first body part 500.

Figure 6:
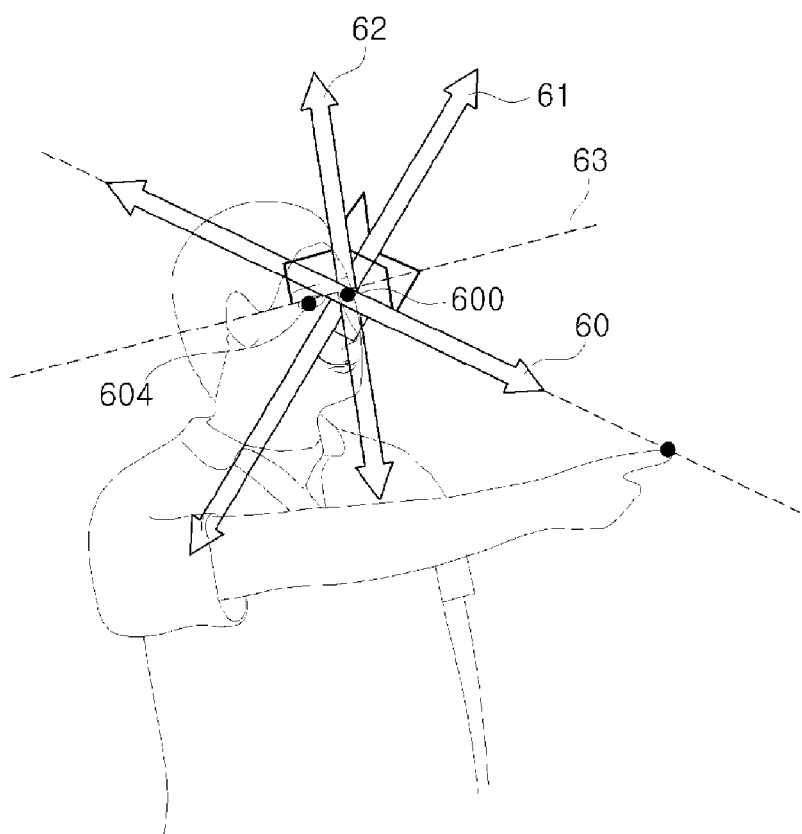
FIG. 6 is a diagram showing yet another example of a method for defining an up/down axis and left/right axis of a user-based spatial coordinate system.

FIG. 6 is a diagram showing yet another example of a method for defining an up/down axis and left/right axis of a user-based spatial coordinate system.

When a user's head is tilted, the left and right directions recognized by the user may not be parallel to a ground surface.

An up/down axis 62 may be defined as (i) passing through a first body part 600 (e.g., a left eye) (the first body part may be any one of two eyes of the user which may be a reference point, and the dominant one of the two eyes may be used as the first body part. Hereinafter, the same applies throughout the specification), (ii) perpendicularly crossing an extension line 63 of the first body part 600 (i.e., the origin of the user-based spatial coordinate system) and a third body part 604 (e.g., a right eye) at the first body part 600, and (iii) perpendicularly crossing a front/rear axis 60 at the first body part 600, so that the left/right axis and up/down axis recognized by the user are not changed even when the user's head is tilted.

A left/right axis 61 is determined as a straight line perpendicularly crossing both the front/rear axis 60 and up/down axis 62 at the origin which corresponds to the first body part 600.

Figure 7:
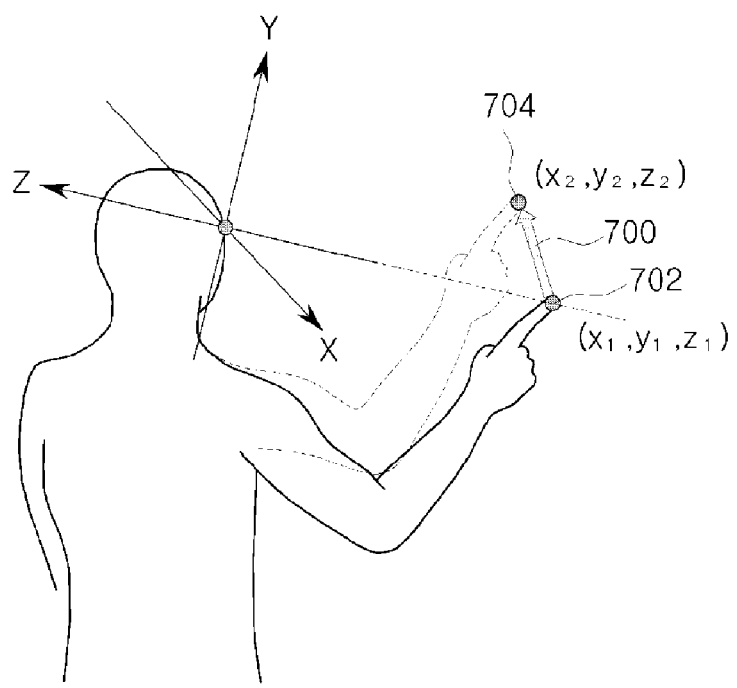
FIG. 7 is a diagram illustrating a motion vector in a user-based spatial coordinate system.

FIG. 7 is a diagram illustrating a motion vector in a user-based spatial coordinate system.

A motion vector 700 is a vector representing a motion between a second body part 702 of a user at a first time point and a second body part 704 at a second time point following the first time point. By interpreting the motion vector over time in the user-based spatial coordinate system, the meaning of the user's gesture may be recognized to better coincide with the user's intention.

Here, a left/right axis, up/down axis and front/rear axis of the user-based spatial coordinate system are represented by the x-axis, y-axis, and z-axis of an orthogonal coordinate system, respectively, as shown in the drawing. (Meanwhile, the positive direction of the z-axis corresponds to a rear side of the user.)

A method for detecting a gesture by interpreting a motion vector will be described in more detail below with reference to FIG. 8 and the subsequent drawings.

Figure 8:
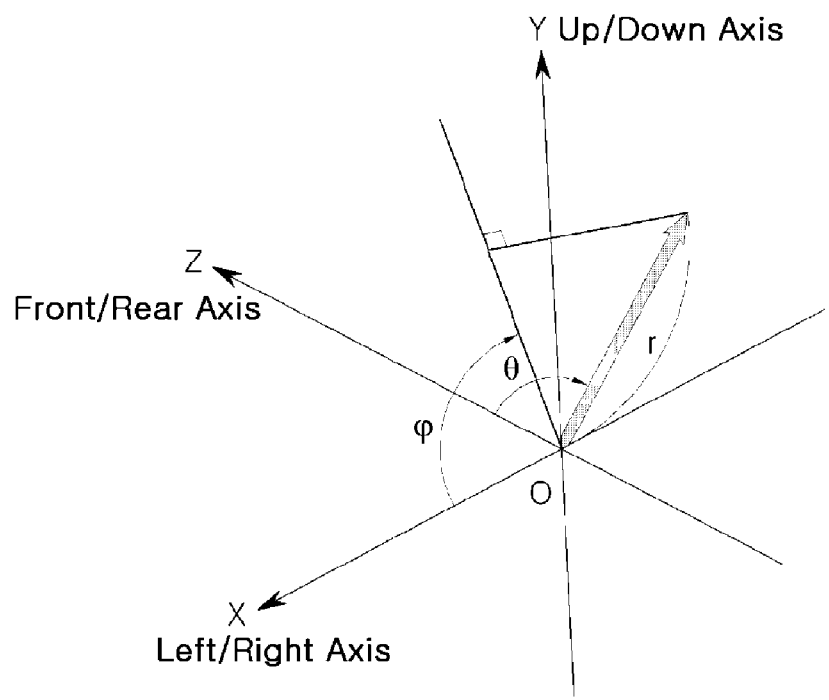
FIG. 8 is a diagram expressing the motion vector of FIG. 7 in spherical coordinates.

FIG. 8 is a diagram expressing the motion vector of FIG. 7 in spherical coordinates.

The present inventor(s) have discovered that by expressing the motion vector illustrated in FIG. 7 in spherical coordinates in a user-based spatial coordinate system, the meaning of a gesture may be interpreted very easily based on the motion vector.

The coordinates of the second body part 702 of the user at the first time point and those of the second body part 704 at the second time point in FIG. 7 are represented by $(x_1, y_1, z_1)$ and $(x_2, y_2, z_2)$ in the user-based spatial coordinate system, respectively.

Here, the motion vector representing the movement of the user's second body part for a time period from the first time point to the second time point may be expressed as V=(r, θ, φ).

r represents a movement distance of the user's second body part for the time period from the first time point to the second time point. θ denotes an angle formed with the positive direction of the front/rear axis. φ denotes an angle formed between the motion vector projected on the x-y plane and the positive direction of the left/right axis (where $0° \leq \varphi \leq 360°$, $0° \leq \theta \leq 180°$).

Further, the motion vector V may be expressed as Eq. 1 below.

$$V = (r, \theta, \varphi) \quad \text{(Eq. 1)}$$
$$= \left(\sqrt{(x_2-x_1)^2 + (y_2-y_1)^2 + (z_2-z_1)^2},\right.$$
$$\left. \arccos(z_2-z_1)/r, \arctan(y_2-y_1)/(x_2-x_1)\right).$$

Table 1 illustrates the relationship between the direction of the motion vector and the magnitudes of θ and φ.

Figure 9:
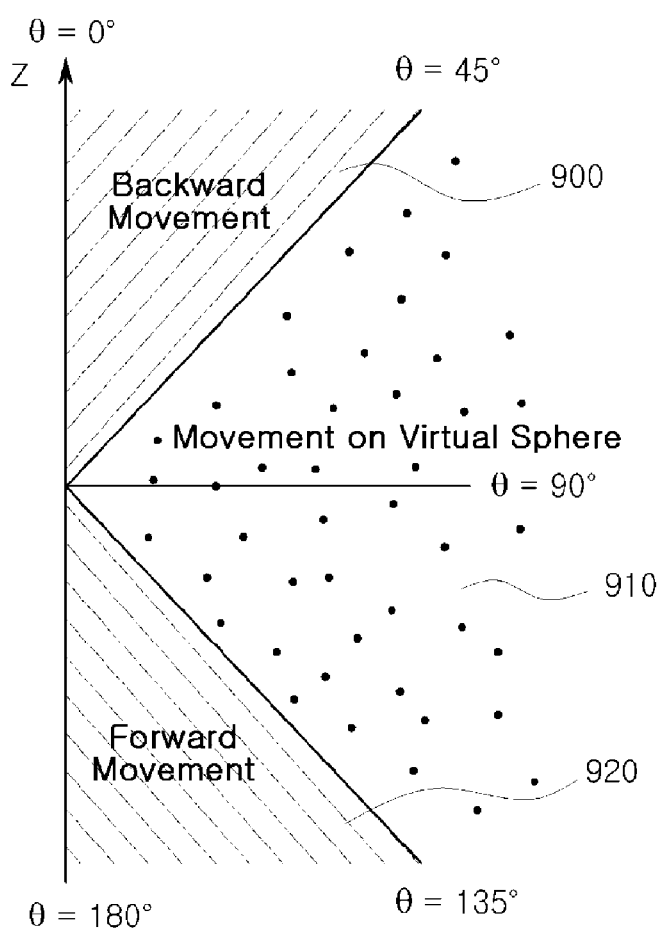
FIG. 9 is a diagram showing the relationship between the magnitude of the θ component of the motion vector formed with the z-axis and the direction of the motion vector.

FIG. 9 is a diagram showing the relationship between the magnitude of the θ component of the motion vector formed with the z-axis and the direction of the motion vector.

Figure 10:
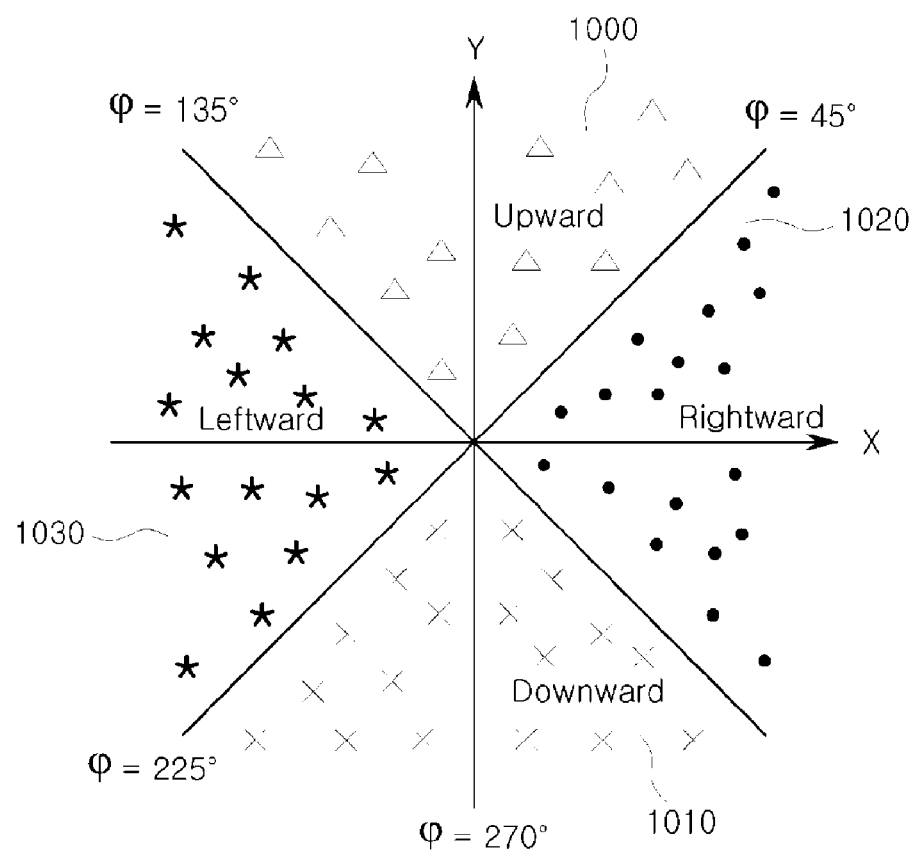
FIG. 10 is a diagram showing the relationship between the magnitude of the φ component of the motion vector formed with the x-axis and the direction of the motion vector.

FIG. 10 is a diagram showing the relationship between the magnitude of the φ component of the motion vector formed with the x-axis and the direction of the motion vector.

In the example of Table 1 and FIGS. 9 and 10, the direction of movement of the motion vector is defined as only six directions, i.e., a forward direction, a backward direction, a leftward direction, a rightward direction, an upward direction, and a downward direction. That is, other directions of movement will be omitted in Table 1 for simplicity of description.

TABLE 1

| Direction of Movement | Θ | Φ |
|---|---|---|
| Forward | 135°-180° | — |
| Backward | 0°-45° | — |
| Leftward | 45°-135° | 135°-225° |
| Rightward | 45°-135° | 315°-45° |
| Upward | 45°-135° | 45°-135° |
| Downward | 45°-135° | 225°-315° |

The user cannot move his/her body to draw a straight line or perfect circle. Even if the intention of the user is to move his/her fingertip to the left side, it would actually move obliquely rather than move exactly to the left side. Thus, it is necessary to take account of some errors in interpreting the user's motion.

Taking account of such errors, a region 900 where the range of θ is $0° \leq \theta \leq 45°$ is defined as a rear side. In this range, the motion vector (i.e., the user's fingertip) is interpreted as moving backward, regardless of the value of φ.

Likewise, a region 920 where the range of θ is $135° \leq \theta \leq 180°$ is defined as a front side. In this range, the motion vector (i.e., the user's fingertip) is interpreted as moving forward, regardless of the value of φ.

A region 910 where the range of θ is $45° \leq \theta \leq 135°$ is defined as being neither of the front and rear sides. Thus, when the range of θ is $45° \leq \theta \leq 135°$, a region 1030 where $135° \leq \varphi \leq 225°$ is defined as a left side; a region 1020 where $315° \leq \varphi \leq 45°$ is defined as a right side; a region 1000 where $45° \leq \varphi \leq 135°$ is defined as an upper side; and a region 1010 where $225° \leq \varphi \leq 315°$ is defined as a lower side, depending on the range of φ.

That is, when the range of θ corresponds to the region 910, the motion vector for which the range of φ corresponds to the region 1000, 1010, 1020, or 1030 is interpreted as moving upward, downward, rightward, or leftward.

Table 2 illustrates the relationship between the direction of the motion vector and the magnitudes of θ and φ, with the direction of the motion vector being further subdivided.

In Table 1, the direction of the motion vector is defined as only six directions. However, the six directions may be insufficient to define the movement of the fingertip. Thus, the direction of the motion vector is defined as 18 directions in Table 2.

TABLE 2

| Direction of Movement | Θ | Φ |
|---|---|---|
| Forward | 50°-180° | — |
| Forward-Leftward | 120°-150° | 135°-225° |

TABLE 2-continued

| Direction of Movement | Θ | Φ |
|---|---|---|
| Forward-Rightward | 120°-150° | 315°-45° |
| Forward-Upward | 120°-150° | 45°-135° |
| Forward-Downward | 120°-150° | 225°-315° |
| Leftward | 60°-120° | 155°-205° |
| Leftward-Upward | 60°-120° | 115°-155° |
| Upward | 60°-120° | 65°-115° |
| Rightward-Upward | 60°-120° | 25°-65° |
| Rightward | 60°-120° | 335°-25° |
| Rightward-Downward | 60°-120° | 295°-335° |
| Downward | 60°-120° | 245°-295° |
| Leftward-Downward | 60°-120° | 205°-245° |
| Backward-Leftward | 30°-60° | 135°-225° |
| Backward-Rightward | 30°-60° | 315°-45° |
| Backward-Upward | 30°-60° | 45°-135° |
| Backward-Downward | 30°-60° | 225°-315° |
| Backward | 0°-30° | — |

As shown in Table 2, the direction of movement of the motion vector may be determined according to the relationship between the magnitudes of θ and φ of the motion vector for a time period $t_2-t_1$.

For example, when θ and φ of the motion vector are 130° and 1°, it may be determined that the user's fingertip is moved in the forward-rightward direction for the time period $t_2-t_1$.

Figure 11:
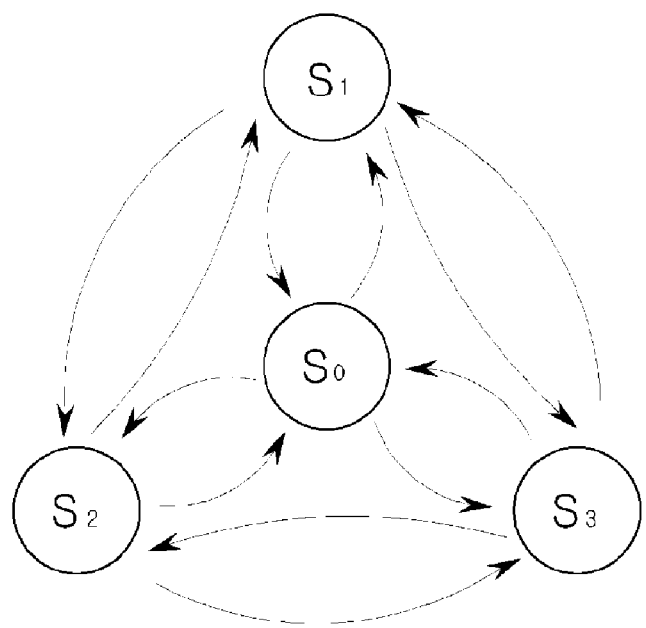
FIG. 11 is a state diagram showing a movement state of a motion vector.

FIG. 11 is a state diagram showing a movement state of a motion vector.

As described above in connection with FIG. 7, a motion vector is defined as a displacement between specific time points. For example, a motion vector is defined as a displacement of a fingertip per unit time.

The movement state of the motion vector may be divided into four states as shown in FIG. 11.

In a first state S0, the motion vector is stationary. For example, a state where a user's fingertip is substantially stationary for a unit time corresponds to the state S0.

In a second state S1, the motion vector moves forward. For example, a motion in which a user moves his/her fingertip in a direction away from a first body part (i.e., forward) (the first body part is a reference body part (e.g., a left eye) serving as an origin of a user-based spatial coordinate system.) for a unit time corresponds to the state S1.

In a third state S2, the motion vector moves backward. For example, a motion in which a user moves his/her fingertip in a direction toward a first body part (i.e., backward) (the first body part is a reference body part (e.g., a left eye) serving as an origin of a user-based spatial coordinate system.) for a unit time corresponds to the state S2.

In a fourth state S3, the motion vector moves on a surface. For example, a motion in which a user moves his/her fingertip at a fixed distance from a first body part (the first body part is a reference body part (e.g., a left eye) serving as an origin of a user-based spatial coordinate system.) for a unit time corresponds to the state S3. Further, upward, downward, leftward, and rightward movements all correspond to the state S3.

The four states will be described in more detail.

An apparatus for detecting a gesture of a user receives information on three-dimensional coordinates of a first body part (i.e., a body part serving as an origin of a user-based spatial coordinate system) (e.g., a left eye) and a second body part (i.e., a body part with which a gesture is detected in the user-based spatial coordinate system) (e.g., a fingertip of a specific finger) of the user at each time point with a predetermined time interval, and obtains a motion vector V=(r, θ, φ) of the second body part at each time point.

For example, a 3D ToF camera stores a 3D image, which is acquired by measuring a time for which light is reflected and returned, by one frame at predetermined time intervals, and detects a first body part and a second body part for each stored image frame to generate three-dimensional coordinates of the first and second body parts.

Alternatively, a stereo 3D camera stores a 3D image, which is acquired by using the disparity between two images received from left and right image sensors, by one frame at predetermined time intervals, and detects a first body part and a second body part for each stored image frame to generate three-dimensional coordinates of the first and second body parts.

Alternatively, a structured-light 3D camera acquires 3D information by analyzing the difference between an inputted pattern and a pattern obtained by projecting structured light at one position and then receiving and projecting the light at another position, to store the acquired 3D image by one frame at predetermined time intervals, and detects a first body part and a second body part for each stored image frame to generate three-dimensional coordinates of the first and second body parts.

Alternatively, a three-dimensional coordinates provision means may be a radar that may emit directional microwaves at predetermined time intervals and then measure reflected and returned electromagnetic waves to find three-dimensional coordinates. The radar detects a first body part and a second body part from information detected for each cycle, and generates three-dimensional coordinates of the first and second body parts. Alternatively, the three-dimensional coordinates provision means may be a lidar that may emit directional laser beams while rotating at predetermined time intervals and then measure reflected and returned light to identify three-dimensional coordinates. The lidar detects a first body part and a second body part from information detected for each rotation cycle, and generates three-dimensional coordinates of the first and second body parts.

Alternatively, when GPS (Global Positioning System) receivers are worn on a first body part and a second body part, travel times of radio waves transmitted from different positions are measured for each frame to calculate a distance therebetween. A sphere is generated with each transmission point being a reference point and a travel distance being a radius, and the positions where the spheres overlap are determined to generate three-dimensional coordinates of the first and second body parts.

Alternatively, when IPS (Indoor Positioning System) receivers are worn on a first body part and a second body part, travel times of radio waves and ultrasonic waves transmitted from different positions are measured for each frame to calculate a distance therebetween, or RSSIs (Received Signal Strength Indications) of radio waves and ultrasonic waves transmitted from different positions are measured to calculate a distance therebetween. A sphere is generated with each transmission point being a reference point and a travel distance being a radius, and the positions where the spheres overlap are determined to generate three-dimensional coordinates of the first and second body parts.

Alternatively, when a 9-axis sensor (i.e., a gyro sensor, acceleration sensor, and magnetic field sensor) and a GPS (Global Positioning System) receiver or an IPS (Indoor Positioning System) receiver are worn together on a first body part and a second body part, three-dimensional coordinates generated through GPS or IPS are corrected with posture and motion information inputted through the 9-axis sensor to more accurately generate three-dimensional coordinates of the first and second body parts.

In order to enter the first state S0, the second body part of the user need not necessarily be completely stationary. A state where it is "substantially" stationary is considered as the first state S0. This is to take account of some errors existing between the user's intention and the actual motion as described above.

That is, in order to enter the first state S0, Eq. 2 below should be satisfied.

$$v(t)=r<Th_1 \quad \text{(Eq. 2)}$$

Here, v(t) is the magnitude of the motion vector at a time point t. That is, according to the definition of the motion vector, v(t) denotes the magnitude of the velocity of the second body part at the time point t. When v(t) is smaller than a first threshold $Th_1$, it may be defined that the motion vector is substantially stationary. The first threshold $Th_1$ needs to be a sufficiently small value. Further, only the magnitude of the motion vector needs to be very small, while there are no conditions for θ and φ of the motion vector.

In order to enter the second state S1, the second body part of the user should have a velocity with a predetermined magnitude (i.e., a magnitude not less than a second threshold $Th_2$) and satisfy the conditions of forward movement for θ and φ.

The second threshold $Th_2$ needs to be a value significantly greater than the first threshold $Th_1$.

For example, when six directions of movement (i.e., upward, downward, leftward, rightward, forward, and backward) are defined as shown in Table 1 above, the conditions for satisfying the state S1 are expressed as Eq. 3 below.

$$v(t)=r \geq Th_2 \text{ and } 135° \leq \theta \leq 180° \quad \text{(Eq. 3)}$$

In order to enter the third state S2, the second body part of the user should have a velocity with a predetermined magnitude (i.e., a magnitude not less than a third threshold $Th_3$) and satisfy the conditions of backward movement for θ and φ.

For example, when six directions of movement (i.e., upward, downward, leftward, rightward, forward, and backward) are defined as shown in Table 1 above, the conditions for satisfying the state S2 are expressed as Eq. 4 below.

$$v(t)=r \geq Th_3 \text{ and } 0° \leq \theta \leq 45° \quad \text{(Eq. 4)}$$

In order to enter the fourth state S3, the second body part of the user should have a velocity with a predetermined magnitude (i.e., a magnitude not less than a fourth threshold $Th_4$) and satisfy the conditions of surface movement for θ and φ.

For example, when six directions of movement (i.e., upward, downward, leftward, rightward, forward, and backward) are defined as shown in Table 1 above, the conditions for satisfying the state S3 are expressed as Eqs. 5 to 8 below.

(i) For upward movement: $v(t)=r \geq Th_4$, $45° \leq \theta \leq 135°$ and $45° \leq \varphi \leq 135°$ (Eq. 5)

(ii) For downward movement: $v(t)=r \geq Th_4$, $45° \leq \theta \leq 135°$ and $225° \leq \varphi \leq 315°$ (Eq. 6)

(iii) For leftward movement: $v(t)=r \geq Th_4$, $45° \leq \theta \leq 135°$ and $135° \leq \varphi \leq 225°$ (Eq. 7)

(iv) For rightward movement: $v(t)=r \geq Th_4$, $45° \leq \theta \leq 135°$ and $315° \leq \varphi$ or $\varphi \leq 45°$ (Eq. 8)

A gesture is detected based on a combination of multiple states, i.e., the states S0, S1, S2 and S3.

For example, a "hold" gesture in which the user's fingertip does not move may be detected based on the fact that the state S0 is combined two or more times over time.

Alternatively, a "touch" gesture in which the user's fingertip touches a certain point may be detected based on the fact that the state S1 is combined with the following state S0.

Alternatively, a "release" gesture in which the user's fingertip moves away from a certain point may be detected based on the fact that the state S0 is combined with the following state S2.

Alternatively, a gesture in which the user's fingertip "clicks" on a certain point may be detected based on the fact that the state S1 is combined with the following state S2 (with or without the state S0 being interposed therebetween).

Alternatively, a "drag" gesture in which the user's fingertip moves in any one of upward, downward, leftward, and rightward directions, without approaching or moving away from a first body coordinate point, may be detected based on the fact that the state S3 is combined two or more times. Meanwhile, in the state S3, the specific direction of movement may be identified through the ranges of φ shown in Eqs. 5 to 8 above.

Figure 12:
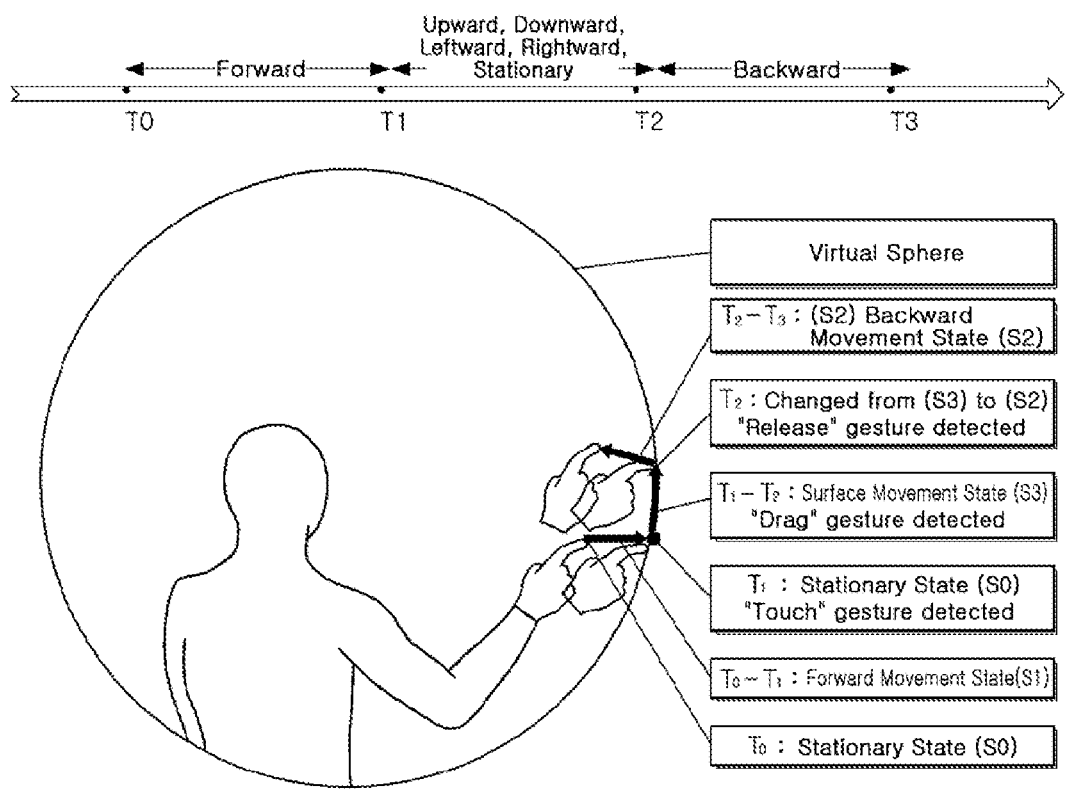
FIG. 12 is a diagram illustrating a method for detecting a gesture of a user on a virtual sphere.

FIG. 12 is a diagram illustrating a method for detecting a gesture of a user on a virtual sphere.

When a motion vector does not move forward or backward (i.e., moves only upward, downward, leftward, or rightward), the trajectory of the motion vector forms a virtual sphere 1200 centered on a first body part 1201.

FIG. 12 illustrates some gestures of the user on the virtual sphere 1200.

When a state of a motion vector 1210 of the user is changed from the state S0 to the state S1 between a time point T0 and a time point T1, and then changed back to the state S0 at the time point T1, it may be determined that a "touch" gesture has been made.

When a state of a motion vector 1220 is changed from the state S1 to the state S3 (with or without the state S0 being interposed therebetween) between the time point T1 and a time point T2, it may be determined that a "drag" gesture has been made upward, downward, leftward, rightward, or the like on the virtual sphere in that time period. (The specific direction of movement may be identified through the ranges of φ shown in Eqs. 5 to 8 above.)

When a state of a motion vector 1230 is changed from the state S3 to the state S2 (with or without the state S0 being interposed therebetween) at the time point T2, it may be determined that a "release" gesture has been made at the time point T2.

Further, when the motion vectors 1210, 1220 and 1230 are combined in this order between the time point T0 and a time point T3, it is possible to implement a series of operations such as selecting a certain object (i.e., a "touch" gesture), dragging the object to a specific folder (i.e., a "drag" gesture), and then dropping it into the folder (i.e., a "release" gesture).

Figure 13:
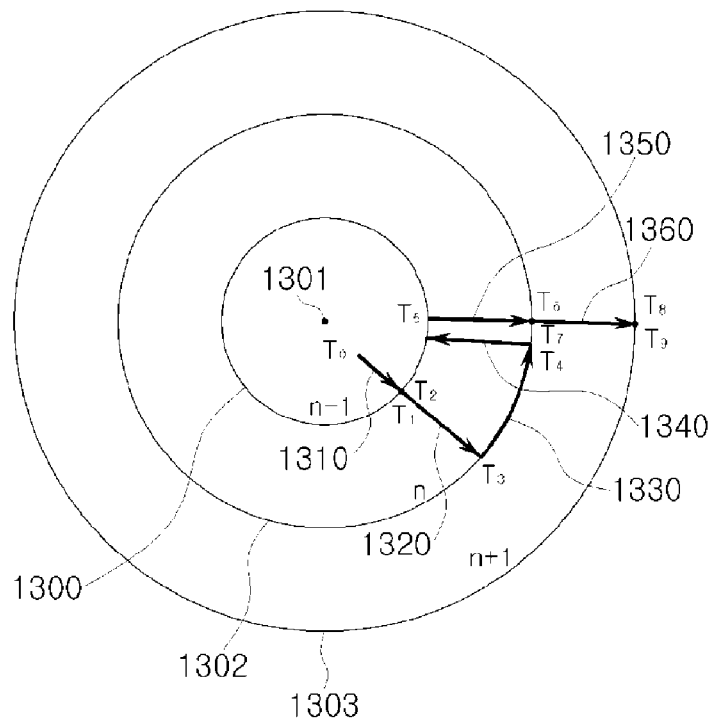
FIG. 13 is a diagram illustrating a method for detecting a gesture of a user on multiple virtual spheres.

FIG. 13 is a diagram illustrating a method for detecting a gesture of a user on multiple virtual spheres.

There may be multiple virtual spheres with a common center. Further, gestures may be combined to move between the multiple virtual spheres.

By utilizing the above characteristics, it is possible to implement and detect a "deep touch" gesture.

An example will be described in which a $(n-1)^{th}$ virtual sphere 1300, $n^{th}$ virtual sphere 1302 and $(n+1)^{th}$ virtual sphere 1303 have a common center 1301 (where $n \leq 2$ and n is an integer).

When a touch gesture is detected based on the state change of a motion vector 1310 between a time point T0 and a time point T1, a second body part of a user is positioned on the surface of the $(n-1)^{th}$ virtual sphere 1300.

Thereafter, when a hold gesture is detected based on the state change of a motion vector (not shown) between the time point T1 and a time point T2, the second body part of the user still remains on the surface of the $(n-1)^{th}$ virtual sphere 1300. (The motion vector is not shown in the drawing because the magnitude of the motion vector in the stationary state is substantially close to zero)

When a touch gesture is detected again based on the state change of a motion vector 1320 between the time point T2 and a time point T3, the second body part of the user is moved from the $(n-1)^{th}$ virtual sphere 1300 to the surface of the $n^{th}$ virtual sphere 1302.

In this situation, when a drag gesture is detected based on the state change of a motion vector 1330 between the time point T3 and a time point T4, it is possible to detect that the second body part of the user is moved upward, downward, leftward, rightward, or the like on the surface of the $n^{th}$ virtual sphere 1302. (The specific direction of movement may be identified through the ranges of $\varphi$ shown in Eqs. 5 to 8 above.)

Thereafter, when a release gesture is detected based on the state change of a motion vector 1340 at a time point T4, the second body part may be moved back to the surface of the $(n-1)^{th}$ virtual sphere 1300.

When a touch gesture is detected again based on the state change of a motion vector 1350 between a time point T5 and a time point T6, the second body part may be moved to the surface of the $n^{th}$ virtual sphere 1302.

Thereafter, when a hold gesture is detected based on the state change of a motion vector (not shown) between the time point T6 and a time point T7, the second body part of the user still remains on the surface of the $n^{th}$ virtual sphere 1302.

Likewise, when a touch gesture is detected based on the state change of a motion vector 1360 between the time point T7 and a time point T8, the second body part may be moved to the surface of the $(n+1)^{th}$ virtual sphere 1303.

Thereafter, when a hold gesture is detected based on the state change of a motion vector (not shown) between the time T8 and a time point T9, the second body part of the user still remains on the surface of the $(n+1)^{th}$ virtual sphere 1303.

In this way, a gesture realized on multiple virtual spheres is feasible.

Figure 14:
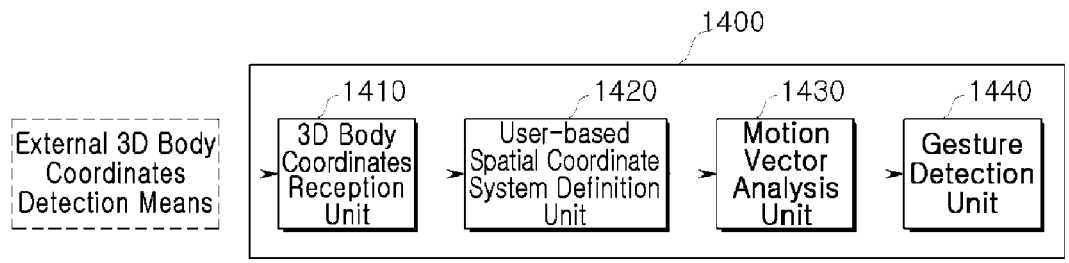
FIG. 14 is a block diagram showing an example of an apparatus for detecting a gesture in a user-based spatial coordinate system.

FIG. 14 is a block diagram showing an example of an apparatus for detecting a gesture in a user-based spatial coordinate system.

A gesture detection apparatus 1400 comprises a three-dimensional body coordinates reception unit 1410, a user-based spatial coordinate system definition unit 1420, a motion vector analysis unit 1430, and a gesture detection unit 1440. The gesture detection apparatus 1400 may be implemented in the form of a set-top box or control box. However, the apparatus is not limited thereto, and may also be implemented in the form of a server operating on a network. Alternatively, it may also be implemented such that it is embedded in various household appliances.

The three-dimensional body coordinates reception unit 1410 receives a plurality of body coordinate points corresponding to a plurality of body parts including a first body part (e.g., one eye) and a second body part (e.g., a fingertip with which a motion is performed) of a user from an external three-dimensional body coordinates detection means.

As described above, the three-dimensional body coordinates detection means may be a variety of devices such as a 3D camera, radar, and lidar.

The three-dimensional body coordinates reception unit 1410 is implemented in the form of an input/output (I/O) device capable of receiving the user's body coordinate points from the three-dimensional body coordinates detection means via wireless or wired data communication. Further, the apparatus may further comprise a storage unit (such as a memory device) for temporarily storing a plurality of body coordinate points received at each frame over time, although it is not shown in the drawing.

The user-based spatial coordinate system definition unit 1420 creates a user-based spatial coordinate system whose origin is located at a first body coordinate point corresponding to the first body part of the user, based on the plurality of body coordinate points received by the three-dimensional body coordinates reception unit 1410.

The motion vector analysis unit 1430 creates a motion vector over time of a second body coordinate point with which a gesture is detected, and determines a state of the motion vector.

The gesture detection unit 1440 detects a gesture of the user based on a change in the state of the motion vector.

The three-dimensional body coordinates reception unit 1410, the user-based spatial coordinate system definition unit 1420, the motion vector analysis unit 1430, and the gesture detection unit 1440 may be in the form of program modules that may be executed by one or more processors of the gesture detection apparatus 1400. The program modules may include operating systems, application program modules, or other program modules, while they may be physically stored on a variety of commonly known storage devices. Such program modules may include, but not limited to, routines, subroutines, programs, objects, components, instructions, data structures, and the like for performing specific tasks or executing specific abstract data types.

Figure 15:
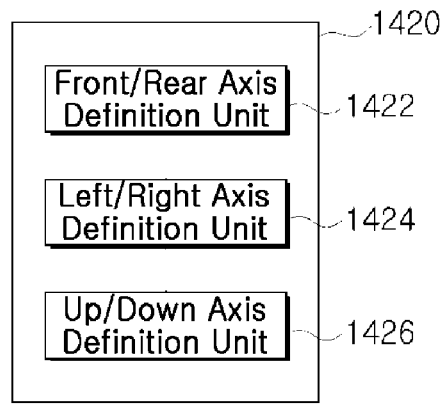
FIG. 15 is a block diagram showing the user-based spatial coordinate system definition unit of the gesture detection apparatus of FIG. 14 in more detail.

FIG. 15 is a block diagram showing the user-based spatial coordinate system definition unit of the gesture detection apparatus of FIG. 14 in more detail.

The user-based spatial coordinate system definition unit 1420 comprises a front/rear axis definition unit 1422, a left/right axis definition unit 1424, and an up/down axis definition unit 1426. The front/rear axis definition unit 1422, the left/right axis definition unit 1424, and the up/down axis definition unit 1426 may be in the form of program modules that may be executed by one or more processors of the gesture detection apparatus 1400.

As described above, the front/rear axis definition unit 1422 defines a front/rear axis indicating front and rear sides of the user in the user-based spatial coordinate system.

Specifically, the front/rear axis definition unit 1422 defines a straight line passing through both the first body coordinate point and the second body coordinate point as the front/rear axis of the user-based spatial coordinate system.

As described above, the front/rear axis may correspond to the z-axis in the user-based spatial coordinate system, and the rear side of the user may correspond to the positive (+) direction of the z-axis.

Figure 16:
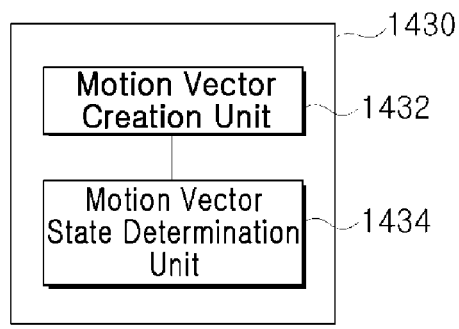
FIG. 16 is a block diagram showing the motion vector analysis unit of the gesture detection apparatus of FIG. 14 in more detail.

FIG. 16 is a block diagram showing the motion vector analysis unit of the gesture detection apparatus of FIG. 14 in more detail.

The motion vector analysis unit 1430 comprises a motion vector creation unit 1432 and a motion vector state determination unit 1434. The motion vector creation unit 1432 and the motion vector state determination unit 1434 may be in the form of program modules that may be executed by one or more processors of the gesture detection apparatus 1400.

The motion vector creation unit 1432 creates a motion vector V having spherical coordinates as shown in Eq. 1 and FIG. 8, with respect to a second body coordinate point $(x_1, y_1, z_1)$ at a first time point $(t=t_1)$ and a second body coordinate point $(x_2, y_2, z_2)$ at a second time point $(t=t_2)$.

The motion vector state determination unit 1434 determines the state of the motion vector based on the values of the r, θ and φ components of the motion vector expressed in the spherical coordinates, as described above. As a result, the state of the motion vector is specified as any one of the stationary state S0, the forward movement state S1, the backward movement state S2, and the surface movement state S3.

Figure 17:
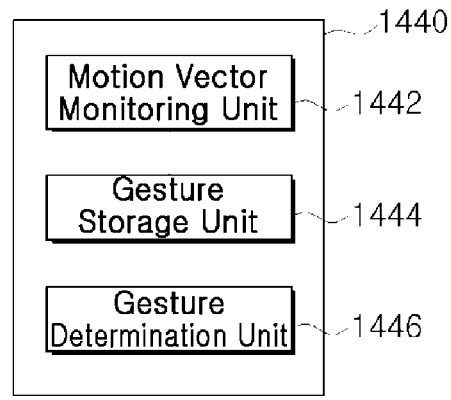
FIG. 17 is a block diagram showing the gesture detection unit of the gesture detection apparatus of FIG. 14 in more detail.

FIG. 17 is a block diagram showing the gesture detection unit of the gesture detection apparatus of FIG. 14 in more detail.

The gesture detection unit 1440 comprises a motion vector monitoring unit 1442, a gesture storage unit 1444, and a gesture determination unit 1446. The motion vector monitoring unit 1442, the gesture storage unit 1444, and the gesture determination unit 1446 may be in the form of program modules that may be executed by one or more processors of the gesture detection apparatus 1400.

The motion vector monitoring unit 1442 monitors whether there is a change in the state of the motion vector at a corresponding time point.

For example, when the state of the motion vector is the state S0 at a time point (t=t1) while it was the state S1 at a preceding time point, the motion vector monitoring unit 1442 recognizes that the state of the motion vector has been changed from the state S1 to the state S0.

The gesture storage unit 1444 stores a type of gesture corresponding to each type of change in the state of the motion vector.

For example, the type (or pattern) of change from the state S1 to the state S0 in the preceding example corresponds to a "touch" gesture. Physically, this means a state where a fingertip (i.e., a second body part) of the user moves forward for a predetermined time and then stops. That is, it corresponds to the user's action of touching a point of a virtual sphere with the fingertip.

The combinations of various states of the motion vector correspond to various gestures, and the gesture storage unit 1444 stores information on the combinations of the states of the motion vector and the relationship with the corresponding gestures. The gesture storage unit 1444 may be implemented by various memory devices.

The gesture determination unit 1446 determines the type of gesture corresponding to the type (or pattern) of change in the state of the motion vector obtained by the motion vector monitoring unit 1442, with reference to the gesture storage unit 1444. Finally, the gesture determination unit 1446 determines that gesture as a gesture performed by the user at the corresponding time point, and finishes the gesture detection process.

Figure 18:
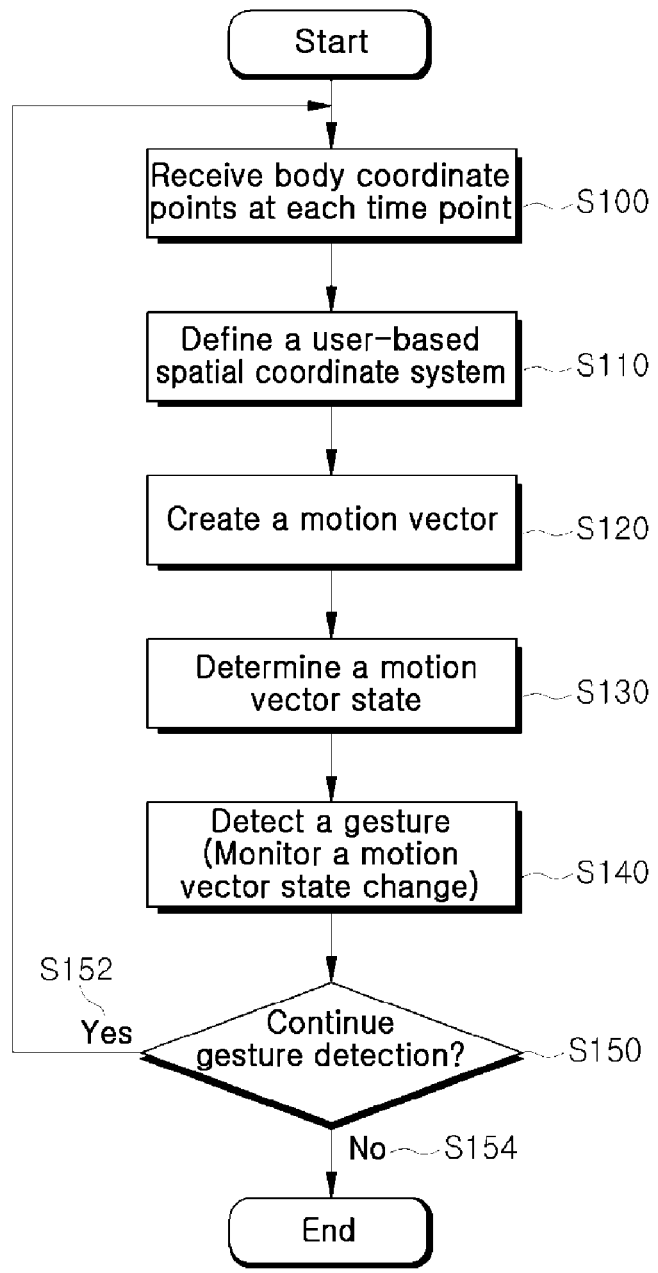
FIG. 18 is a flow chart showing an example of a method for detecting a gesture in a user-based spatial coordinate system.

FIG. 18 is a flow chart showing an example of a method for detecting a gesture in a user-based spatial coordinate system.

In step S100, body coordinate points corresponding to each time point are received. When an external three-dimensional body coordinates detection means is a 3D camera, a user's body coordinate points are received for each image frame corresponding to each time point.

In step S110, a front/rear axis, up/down axis, and left/right axis are defined based on the received body coordinate points, so that a user-based spatial coordinate system is defined.

In step S120, a motion vector related to a second body coordinate point for motion and gesture detection is created in the user-based spatial coordinate system.

In step S130, a state of the motion vector at each time point is determined.

In step S140, a gesture is detected based on a change in the state of the motion vector.

The flow of steps S100 to S140 is repeatedly performed while a gesture detection apparatus continues to operate.

Accordingly, the gesture detection apparatus determines whether to continue the gesture detection for the user (S150). When the gesture detection apparatus continues to perform the gesture detection (S152), the process returns to step S100. When the gesture detection is to be terminated (S154), the body coordinate points are no longer received and the operation is terminated.

The detailed description of the present disclosure has been made with reference to the drawings and the various embodiments.

However, the above description merely provides examples for illustrating the disclosure. That is, the disclosure is not limited to the drawings and embodiments, and it is apparent that the embodiments falling within the appended claims and other modified embodiments will fall within the scope of the present subject matter.

What is claimed is:

1. A method for detecting a gesture in a user-based spatial coordinate system, comprising the steps of - the user-based spatial coordinate system comprises a three- dimensional body coordinates reception unit, a user-based spatial coordinate system definition unit, a motion vector analysis unit, and a gesture detection unit:
   receiving, by the three-dimensional body coordinates reception unit, a plurality of body coordinate points corresponding to a plurality of body parts including a first body part and a second body part of a user;
   defining, by the user-based spatial coordinate system definition unit, a user- based spatial coordinate system whose origin is located at a first body coordinate point corresponding to the first body part of a user;
   generate, by the motion vector analysis unit, a motion vector overtime of a second body coordinate point corresponding to the second body part of the user in the user-based spatial coordinate system;
   analyzing, by the motion vector analysis unit, a state of the motion vector; and
   detecting, by the gesture detection unit, a gesture of the user based on a change in the state of the motion vector,
   wherein the step of defining the user-based spatial coordinate system further comprises the steps of:
   creating, by the user-based spatial coordinate system definition unit, a front/rear axis of the user-based spatial coordinate system corresponding to a straight line connecting the first body coordinate point and the second body coordinate point, and creating, by the user-based spatial coordinate system definition unit, a left/right axis and an up/down axis of the user-based spatial coordinate system to perpendicularly cross the created front/rear axis, wherein the left/right axis of the user-based spatial coordinate system is perpendicular to the up/down axis of the user-based spatial coordinate system, wherein the first body coordinate point corresponds to one of two eyes of the user and the second body coordinate point corresponds to a finger of the user, the left/right axis of the user-based spatial coordinate system is defined as coinciding with the left and right directions recognized by the user, and wherein the left/right axis is created to pass through the first body coordinate point and to be parallel to a ground surface, wherein the up/down axis is created to pass through the first body coordinate point.

2. The method of claim 1, wherein the up/down axis is created to pass through the first body coordinate point and to perpendicularly cross a straight line connecting the first body coordinate point and a third body coordinate point corresponding to a third body part at the first body coordinate point, wherein the left/right axis is created to pass through the first body coordinate point, wherein the first body part and the third body part are different from each other.

3. The method of claim 1, wherein the step of analyzing the state of the motion vector comprises the step of:

creating, by the motion vector analysis unit, the motion vector V to have spherical coordinates, with respect to the second body coordinate point $(x_1, y_1, z_1)$ of the second body part at a first time point and the second body coordinate point $(x_2, y_2, z_2)$ at a second time point, wherein:

$$V = (r, \theta, \varphi)$$
$$= \left(\sqrt{(x_2 - x_1)^2 + (y_2 - y_1)^2 + (z_2 - z_1)^2},\right.$$
$$\left. \arccos(z_2 - z_1)/r, \arctan(y_2 - y_1)/(x_2 - x_1)\right).$$

4. The method of claim 3, wherein the step of analyzing the state of the motion vector further comprises the step of:

specifying, by the motion vector analysis unit, the state of the motion vector as any one of a stationary state, a forward movement state, a backward movement state, and a surface movement state, based on the r, $\theta$ and $\varphi$ of the motion vector.

5. The method of claim 4, wherein the step of detecting the gesture of the user comprises the step of:

determining, by the gesture detection unit, that a touch gesture is made, when the state of the motion vector is changed from the forward movement state to the stationary state.

6. The method of claim 4, wherein the step of detecting the gesture of the user comprises the step of:

determining, by the gesture detection unit, that a release gesture is made, when the state of the motion vector is changed to the backward movement state.

7. The method of claim 4, wherein the step of detecting the gesture of the user comprises the step of:

determining, by the gesture detection unit, that a click gesture is made, when the state of the motion vector is changed from the forward movement state through the stationary state to the backward movement state, or from the forward movement state to the backward movement state.

8. The method of claim 4, wherein the step of detecting the gesture of the user comprises the step of:

determining, by the gesture detection unit, that a drag gesture is made on a surface of a virtual sphere, when the state of the motion vector is changed to the surface movement state.

9. The method of claim 4, wherein the step of detecting the gesture of the user comprises the step of:

determining, by the gesture detection unit, that a hold gesture is made, when the state of the motion vector remains in the stationary state.

10. The method of claim 4, wherein the step of detecting the gesture of the user comprises the step of:

determining, by the gesture detection unit, that a deep touch gesture is made, when the state of the motion vector is changed in an order of the forward movement state, the stationary state, the forward movement state, and the stationary state.

11. An apparatus for detecting a gesture in a user-based spatial coordinate system, comprising:

one or more processors;

machine readable and executable instructions that, when executed by the one or more processors, cause the apparatus to:

receive a plurality of body coordinate points corresponding to a plurality of body parts including a first body part and a second body part of a user;

create a user-based spatial coordinate system whose origin is located at a first body coordinate point corresponding to the first body part, based on the plurality of body coordinate points;

generate a motion vector over time of a second body coordinate point, and to determine a state of the motion vector; and detect a gesture of the user based on a change in the state of the motion vector, wherein the machine readable and executable instructions, when executed by the one or more processors, cause the apparatus to:

create a front/rear axis of the user-based spatial coordinate system corresponding to a straight line connecting the first body coordinate point and the second body coordinate point, create a left/right axis of the user-based spatial coordinate system to perpendicularly cross the created front/rear axis, and create a up/down axis of the user-based spatial coordinate system to perpendicularly cross the created front/rear axis, wherein the left/right axis of the user-based spatial coordinate system is perpendicular to the up/down axis of the user-based spatial coordinate system, and wherein the first body coordinate point corresponds to one of two eyes of the user and the second body coordinate point corresponds to a finger of the user, the left/right axis of the user-based spatial coordinate system is defined as coinciding with the left and right directions recognized by the user, and wherein the machine readable and executable instructions, when executed by the one or more processors, cause the apparatus to: create the left/right axis to pass through the first body coordinate point and to the parallel to a ground surface; and create the up/down axis to pass through the first body coordinate point.

12. The apparatus of claim 11, wherein the machine readable and executable instructions, when executed by the one or more processors, cause the apparatus to:

create the up/down axis to pass through the first body coordinate point and to perpendicularly cross a straight line connecting the first body coordinate point and a third body coordinate point corresponding to a third body part at the first body coordinate point, wherein the left/right axis definition unit creates the left/right axis to pass through the first body coordinate point, wherein the first body part and the third body part are different from each other.

13. The apparatus of claim 11, wherein the machine readable and executable instructions, when executed by the one or more processors, cause the apparatus to:

create the motion vector V to have spherical coordinates, with respect to the second body coordinate point ($x_1$, $y_1$, $z_1$) of the second body part at a first time point and the second body coordinate point ($x_2$, $y_2$, $z_2$) at a second time point, as below:

$$V = (r, \theta, \varphi)$$
$$= \left( \sqrt{(x_2 - x_1)^2 + (y_2 - y_1)^2 + (z_2 - z_1)^2} , \arccos(z_2 - z_1)/r, \arctan(y_2 - y_1)/(x_2 - x_1) \right).$$

14. The apparatus of claim 13, wherein the machine readable and executable instructions, when executed by the one or more processors, cause the apparatus to:

specify the state of the motion vector as any one of a stationary state, a forward movement state, a backward movement state, and a surface movement state, based on the r, $\theta$ and $\varphi$ of the motion vector.

15. The apparatus of claim 14, wherein machine readable and executable instructions, when executed by the one or more processors, cause the apparatus to:

monitor a change in the state of the motion vector;

store a type of gesture corresponding to each type of change in the state of the motion vector; and determine the type of gesture of the user corresponding to the change in the state of the motion vector, based on the gesture storage unit.

* * * * *